US010201880B2

(12) United States Patent
Osuki et al.

(10) Patent No.: US 10,201,880 B2
(45) Date of Patent: Feb. 12, 2019

(54) WELDING MATERIAL AND WELDING JOINT

(75) Inventors: Takahiro Osuki, Nishinomiya (JP); Kiyoko Takeda, Nishinomiya (JP); Tetsuo Yokoyama, Sandashi (JP); Hiroyuki Anada, Nishinomiya (JP); Masatoshi Toyoda, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 579 days.

(21) Appl. No.: 14/117,223

(22) PCT Filed: May 11, 2012

(86) PCT No.: PCT/JP2012/062090

§ 371 (c)(1), (2), (4) Date: May 7, 2014

(87) PCT Pub. No.: WO2012/157542

PCT Pub. Date: Nov. 22, 2012

(65) Prior Publication Data

US 2014/0286698 A1 Sep. 25, 2014

(30) Foreign Application Priority Data

May 13, 2011 (JP) ................................ 2011-107863

(51) Int. Cl.

| | |
|---|---|
| ***B23K 35/34*** | (2006.01) |
| ***C22C 38/00*** | (2006.01) |
| ***C22C 38/44*** | (2006.01) |
| ***C22C 38/48*** | (2006.01) |
| ***G21C 13/032*** | (2006.01) |
| ***B23K 35/30*** | (2006.01) |
| ***B23K 35/02*** | (2006.01) |
| ***C22C 38/02*** | (2006.01) |
| ***C22C 38/04*** | (2006.01) |
| ***C22C 38/46*** | (2006.01) |
| ***B23K 35/00*** | (2006.01) |
| ***C22C 38/58*** | (2006.01) |

(52) U.S. Cl.

CPC ............ *B23K 35/34* (2013.01); *B23K 35/004* (2013.01); *B23K 35/0288* (2013.01); *B23K 35/308* (2013.01); *B23K 35/3086* (2013.01); *C22C 38/001* (2013.01); *C22C 38/004* (2013.01); *C22C 38/02* (2013.01); *C22C 38/04* (2013.01); *C22C 38/44* (2013.01); *C22C 38/46* (2013.01); *C22C 38/48* (2013.01); *C22C 38/58* (2013.01); *G21C 13/032* (2013.01); *Y02E 30/40* (2013.01); *Y10T 403/478* (2015.01)

(58) Field of Classification Search

None

See application file for complete search history.

(56) References Cited

U.S. PATENT DOCUMENTS

| | | | | |
|---|---|---|---|---|
| 5,908,486 | A | 6/1999 | Flinn et al. | |
| 2005/0257853 | A1* | 11/2005 | Yamashita ......... | B23K 35/0255 148/26 |
| 2007/0187379 | A1* | 8/2007 | Osuki .................. | C22C 19/053 219/137 WM |
| 2012/0003116 | A1* | 1/2012 | Osuki .................... | C21D 6/004 420/53 |

FOREIGN PATENT DOCUMENTS

| | | | |
|---|---|---|---|
| CN | 101352786 | | 1/2009 |
| EP | 2 048 255 | | 4/2009 |
| JP | 62-183994 | | 8/1987 |
| JP | H09308988 | A * | 12/1997 |
| JP | 2001009589 | A * | 1/2001 |
| JP | 2001107196 | A * | 4/2001 |
| JP | 2006-183082 | | 7/2006 |
| JP | 2006-315079 | | 11/2006 |
| JP | 2006-315080 | | 11/2006 |
| JP | 2007-105733 | | 4/2007 |
| JP | 2010-142843 | | 7/2010 |
| JP | 4530112 | | 8/2010 |
| WO | 2010/110003 | | 9/2010 |

OTHER PUBLICATIONS

English machine translation of Ogawa et al., JP 2006-183082, Weld Joint of High-Cr Steel and Welding Material Therefor, Translated Mar. 3, 2016.*

English Machine translation of JP2001-107196A dated Feb. 2, 2017.*

English Machine translation of JP2001-009589A dated Feb. 2, 2017.*

English machine translation of JP H09308988 from EPO dated Dec. 14, 2017.*

* cited by examiner

*Primary Examiner* — Adam Krupicka

(74) *Attorney, Agent, or Firm* — Clark & Brody

(57) ABSTRACT

There is provided a welding material used for welding of SUS310 stainless steel base metal that contains at least one of Nb and V and is excellent in intergranular corrosion resistance, the chemical composition of the welding material consisting, by mass percent, of C: 0.02% or less, Si: 2% or less, Mn: 2% or less, Cr: 26 to 50%, N: 0.15% or less, P: 0.02% or less, S: 0.002% or less, and Ni: a content percentage satisfying [$5 \leq Ni \leq Cr-14$], and the balance of Fe and impurities. Also, there is provided a welding joint of an austenitic stainless steel, which consists of the base metal and a weld metal formed by using the welding material.

3 Claims, No Drawings

WELDING MATERIAL AND WELDING JOINT

TECHNICAL FIELD

The present invention relates to a welding material and a welding joint. More particularly, it relates to a welding joint of an austenitic stainless steel having weld crack resistance, especially a welding joint of an austenitic stainless steel excellent in weld crack resistance, which joint is suitable for a structural member used in high-temperature aqueous environments or a core material such as a shroud, and a welding material for an austenitic stainless steel suitable for producing the welding joint.

BACKGROUND ART

SUS310 stainless steels are highly corrosion resistant and have higher workability and mechanical properties than SUS316 stainless steels and SUS304 stainless steels, and therefore have been used, for example, as structural members used in high-temperature aqueous environments in nuclear plants and the like.

Patent Document 1 discloses a stainless steel that is provided with excellent intergranular corrosion resistance by adding Nb and/or V to the SUS310 stainless steel, and not only is used for a structural member used in high-temperature aqueous environments in a nuclear power plant but also is suitable as a core material such as a shroud.

On the other hand, in order to use such a material as a structural member or the like in a nuclear power plant, welding is essential, and it is indispensable that defects such as weld cracks do not occur in a welding joint portion.

Patent Document 2 discloses a welding joint of SUS310 stainless steel excellent in stress corrosion cracking resistance, and a welding material.

Also, Non Patent Documents 1 and 2 describe solidification cracking and reheat cracking in a welding joint portion.

LIST OF PRIOR ART DOCUMENTS

Patent Document

Patent Document 1: WO2010/110003
Patent Document 2: JP2006-183082A

Non Patent Document

Non Patent Document 1: Kazutoshi Nishimoto, Shogo Natsume, Kazuhiro Ogawa, and Osa Matsumoto: "Welding of Stainless Steels", Sanpou Shuppan, p. 86
Non Patent Document 2: Kazuyuki Saida, Yuki Nomotoi, Akira Taniguchi, Masashi Sakamoto, and Kazutoshi Nishimoto: Quarterly Journal of the Japan Welding Society, 2010, PP. 61-71

DISCLOSURE OF THE INVENTION

Problems to be Solved by the Invention

The SUS310 stainless steel disclosed in Patent Document 1 is suitable for a structural member and a core material in a nuclear power plant. However, Patent Document 1 does not describe the welding material used for welding and the welding control conditions of the stainless steel.

In particular, in the SUS310 stainless steel disclosed in Patent Document 1, the Cr equivalent/Ni equivalent is relatively low to the SUS316 stainless steel, and austenite functions as a stable component balance. Therefore, as described in Non Patent Document 1, as the composition of weld metal approaches the composition of base metal in which the Cr equivalent/Ni equivalent is low, weld cracks such as solidification cracking and reheat cracking may be liable to occur in a welding joint.

Further, since Nb and/or V are added in addition to the fact that grain is solid-solution strengthened by high Cr and Ni contents, it is also possible that, also in the weld metal, during the solidification process or the reheat process at the multi-pass weld time, carbo-nitrides are liable to precipitate from inner grain and to harden, and the susceptibility to reheat cracking is increased.

Therefore, the study of the welding material and welding control conditions for preventing weld cracks, which is conducted to use the SUS310 stainless steel excellent in intergranular corrosion resistance disclosed in Patent Document 1 as a welded structure, is greatly meaningful.

Also, in Patent Document 2, since Nb or V is not added to the base metal to be welded, the problem concerning the reheat cracking is not considered at all.

Concerning the reheat cracking in which the grain boundary of the weld metal obtained by welding does not withstand the thermal stress caused by the welding cycle of the next layer and slides as a result, Non Patent Document 2 describes that the decrease in contents of P and S, which are impurity elements, is effective for the 690 alloy causing complete austenite solidification. However, Non Patent Document 2 does not describe at all the method for preventing reheat cracking in the weld metal in which the granular portion is strengthened because carbo-nitrides are precipitated from the granular portion due to Nb or V content.

Accordingly, an objective of the present invention is to provide a welding joint in which a SUS310 stainless steel excellent in intergranular corrosion resistance, containing Nb and/or V, is a base metal, and weld cracks do not occur, and a welding material that is suitable for producing the welding joint.

Means for Solving the Problems

The present inventors conducted studies of the welding joint capable of preventing not only solidification cracking but also reheat cracking of a SUS310 stainless steel having a low ratio of Cr equivalent/Ni equivalent and characterized by containing Nb and/or V, and resultantly obtained the findings described below.

(A) As described in Non Patent Document 1 as well, in order to prevent solidification cracking in welding an austenitic stainless steel, it is effective to increase the Cr equivalent/Ni equivalent of weld metal and to crystallize and precipitate ferrite.

(B) Since ferrite has a large solid-solution limit of P, S, and the like, by crystallizing ferrite at the solidification stage, solidification segregation of elements causing grain boundary embrittlement is reduced, and resultantly, grain-boundary segregation can be reduced.

(C) At the same time, even if the granular portion is strengthened by the precipitation of carbo-nitrides of Nb or V, by regulating a proper amount or more of ferrite to remain at the grain boundaries, the thermal stress given by the weld thermal cycle of the next layer is relaxed by the grain boundary ferrite, and the grain boundary sliding resistance is enhanced, so that the reheat cracking can be prevented.

(D) In order to prevent the solidification cracking and reheat cracking, it is important to ensure a predetermined amount of ferrite in the weld metal after the completion of solidification at the time of welding of the root pass.

Accordingly, next, the present inventors conducted studies of a welding material for obtaining the welding joint satisfying the above conditions, and resultantly obtained the findings described below.

(E) In order to attain excellent welding workability, the welding material capable of preventing the solidification cracking and reheat cracking is necessary even in the case where the ratio of the base metal flowing into the weld metal is 70% or more.

(F) By increasing the amount of Cr in the welding material so as to be higher than that in the base metal, and by defining the amount of Ni so as to satisfy Formula (I), a welding material capable of preventing the solidification cracking and reheat cracking can be obtained:

$$5 \leq Ni \leq Cr-14 \quad (I)$$

where each symbol of element represents the content (mass %) of each element contained in the welding material.

The present invention was made based on the above-described findings, and includes the welding materials for an austenitic stainless steel described in the following (1) and (2), and the welding joints of austenitic stainless steels described in the following (3) to (5).

(1) A welding material for an austenitic stainless steel, which is used for welding of the austenitic stainless steel having a chemical composition consisting, by mass percent, of C: 0.02% or less, Si: 0.01 to 0.5%, Mn: 0.01 to 2%, Cr: 24 to 26%, Ni: 18 to 22%, Mo: more than 0.10% and less than 0.50%, N: more than 0.04% and 0.15% or less, P: 0.02% or less, and S: 0.002% or less, and one or two elements of Nb: 0.30% or less and V: 0.40% or less, and the balance of Fe and impurities, wherein the chemical composition of the welding material consists, by mass percent, of C: 0.02% or less, Si: 2% or less, Mn: 2% or less, Cr: 26 to 50%, N: 0.15% or less, P: 0.02% or less, S: 0.002% or less, and Ni: a content satisfying Formula (I), and the balance of Fe and impurities:

$$5 \leq Ni \leq Cr-14 \quad (I)$$

where each symbol of element in Formula (I) represents the content (mass %) of each element contained in the welding material.

(2) The welding material for an austenitic stainless steel according to (1), wherein the chemical composition of the welding material further contains, in lieu of a part of Fe, by mass percent, one or more elements selected from Mo: 1% or less, Nb: 0.5% or less, V: 1% or less, and REM: 0.05% or less, and satisfies Formula (II):

$$2 \times Nb+V \leq 1 \quad (II)$$

where each symbol of element in Formula (II) represents the content (mass %) of each element contained in the welding material.

(3) A welding joint of an austenitic stainless steel, consisting of:

a base metal of an austenitic stainless steel consisting, by mass percent, of C: 0.02% or less, Si: 0.01 to 0.5%, Mn: 0.01 to 2%, Cr: 24 to 26%, Ni: 18 to 22%, Mo: more than 0.10% and less than 0.50%, N: more than 0.04% and 0.15% or less, P: 0.02% or less, and S: 0.002% or less, and one or two elements of Nb: 0.30% or less and V: 0.40% or less, and the balance of Fe and impurities, and a weld metal formed by using a welding material consisting, by mass percent, of C: 0.02% or less, Si: 2% or less, Mn: 2% or less, Cr: 26 to 50%, N: 0.15% or less, P: 0.02% or less, S: 0.002% or less, and a content satisfying Formula (I), and the balance of Fe and impurities:

$$5 \leq Ni \leq Cr-14 \quad (I)$$

where each symbol of element in Formula (I) represents the content (mass %) of each element contained in the welding material.

(4) The welding joint of an austenitic stainless steel according to (3), wherein the chemical composition of the welding material further contains, in lieu of a part of Fe, by mass percent, one or more elements selected from Mo: 1% or less, Nb: 0.5% or less, V: 1% or less, and REM: 0.05% or less, and satisfies Formula (II):

$$2 \times Nb+V \leq 1 \quad (II)$$

where each symbol of element in Formula (II) represents the content (mass %) of each element contained in the welding material.

(5) The welding joint of an austenitic stainless steel according to (3) or (4), wherein the welding joint is used for a PLR pipe or a core material such as a shroud of a boiling water type nuclear power plant.

Advantageous Effects of the Invention

According to the present invention, a welding joint of an austenitic stainless steel excellent in intergranular corrosion resistance and weld crack resistance can be obtained stably. Therefore, the welding joint obtained by using the base metal and the welding material in accordance with the present invention is suitable for a welded structural material used as a PLR pipe (primary loop recirculation system pipe) or a core material such as a shroud, which have risks of corrosion damage at grain boundaries in a nuclear power plant.

MODE FOR CARRYING OUT THE INVENTION

1. Chemical Composition of Base Metal

The chemical composition of an austenitic stainless steel forming a base metal of the welding joint of the present invention consists, by mass percent, of C: 0.02% or less, Si: 0.01 to 0.5%, Mn: 0.01 to 2%, Cr: 24 to 26%, Ni: 18 to 22%, Mo: more than 0.10% and less than 0.50%, N: more than 0.04% and 0.15% or less, P: 0.02% or less, and S: 0.002% or less, and one or two elements of Nb: 0.30% or less and V: 0.40% or less, and the balance of Fe and impurities.

The impurities as referred to herein mean the substances that contaminate metal materials during the industrial manufacturing process, derived from the raw materials such as ores and scrap, and various other factors.

The reason for restricting the content of each element is as described below. The symbol "%" concerning the content of each element in the following explanation means "percent by mass".

C: 0.02% or less

C (carbon) is used to deoxidize a steel and to assure the strength of a steel. However, from the viewpoint of corrosion resistance, the C content should be as low as possible to prevent the precipitation of carbides. Therefore, the C content is 0.02% or less. The C content is preferably 0.015% or less. Considering the deoxidation and the assurance of strength of steel, and the precipitation of carbides, the C content is more preferably 0.005% or more and 0.010% or less.

Si: 0.01 to 0.5%

Si (silicon) is used to deoxidize a steel. In the steel of the present invention, the Si content is 0.01% or more. However, if Si is contained excessively, the formation of inclusions is promoted, so that it is desirable that the Si content be low. Therefore, the Si content is 0.01 to 0.5%. The Si content is preferably 0.15% or more and 0.3% or less.

Mn: 0.01 to 2%

Mn (manganese) is an element that is effective in deoxidizing a steel and stabilizing an austenite phase, and when 0.01% or more of Mn is contained, the effects are achieved. On the other hand, Mn forms sulfides together with S, and the sulfides form nonmetallic inclusions. Further, when a steel material is welded, Mn concentrates preferentially on the surface of a weld zone, thereby decreasing the corrosion resistance of the steel material. Therefore, the Mn content is 0.01 to 2%. The lower limit of Mn content is desirably 0.30%, and more desirably 0.40%. Also, the upper limit of Mn content is desirably 0.80%

Cr: 24 to 26%

Cr (chromium) is an element indispensable to maintain the corrosion resistance of steel. If the Cr content is less than 24%, a sufficient corrosion resistance cannot be attained. On the other hand, in the use environment assumed for the steel of the present invention, the content of Cr up to 26% suffices, and if the Cr content exceeds 26%, the workability decreases, and further a problem arises in terms of cost as a practical steel and stabilization of austenite phase. Therefore, the Cr content is 24 to 26%.

Ni: 18 to 22%

Ni (nickel) is an element that is important for stabilizing an austenite phase and maintaining the corrosion resistance. From the viewpoint of corrosion resistance, 18% or more of Ni needs to be contained. On the other hand, in the present invention in which the Cr content is 24 to 26%, if the Ni content increases and exceeds 22%, the weldability decreases. Therefore, from the viewpoint of weldability, the upper limit of Ni content is 22%.

Mo: more than 0.10% and less than 0.50%

Mo (molybdenum) has an action for restraining sensitization, and this action can be brought about when the content is more than 0.10%. However, if the Mo content increases to 0.50% or more, the above-described effect saturates, which merely leads to an increase in cost. Therefore, the Mo content is more than 0.10% and less than 0.50%. The preferable upper limit of Mo content is 0.40%.

N: more than 0.04% and 0.15% or less

N (nitrogen) is an important element in the present invention. By containing N, the strength of steel can be enhanced, and further by increasing the N content, not only the carbo-nitrides of Nb and/or V, which immobilize C in a granular portion, but also nitrides that can immobilize Cr in a granular portion are formed, whereby the sensitization can be restrained. In order to achieve such effects, more than 0.04% of N must be contained. However, if the N content becomes excessive, and especially exceeds 0.15%, the precipitation of Cr nitrides from not only the granular portion but also the grain boundary is promoted, and the intergranular corrosion resistance is decreased. Therefore, the N content is more than 0.04% and 0.15% or less. The lower limit of N content is preferably 0.05%, and more preferably 0.07%. Also, the upper limit thereof is preferably 0.13%.

P: 0.02% or less

P (phosphorus) is an element contained as an impurity. If the content increases and especially exceeds 0.02%, grain boundary embrittlement occurs, and also the corrosion resistance is deteriorated. Further, for the austenitic stainless steel of the present invention, Cr is immobilized as a nitride mainly in the granular portion, and the grain boundary sensitization is restrained. Also, the transgranular strength is increased by the promotion of precipitation of nitrides in the granular portion, so that especially in the case where the P content is more than 0.02%, the difference in strength between the granular portion and the grain boundary embrittled by the segregation of P becomes large, and the crack sensitivity in the weld heat-affected zone is also increased. Therefore, the P content needs to be restricted to 0.02% or less. The P content is preferably 0.015% or less.

S: 0.002% or less

S (sulfur) is an element contained as an impurity. If the content increases and especially exceeds 0.002%, grain boundary embrittlement occurs, and also the corrosion resistance is deteriorated. Further, for the austenitic stainless steel of the present invention, Cr is immobilized as a nitride mainly in the granular portion, and the grain boundary sensitization is restrained. Also, the transgranular strength is increased by the promotion of precipitation of nitrides in the granular portion, so that especially in the case where the S content is more than 0.002%, the difference in strength between the granular portion and the grain boundary embrittled by the segregation of S becomes large, and the crack sensitivity in the weld heat-affected zone is also increased. Therefore, the S content needs to be restricted to 0.002% or less. The S content is preferably 0.001% or less.

Nb, V: one or two elements of Nb: 0.30% or less and V: 0.40% or less

Nb (niobium) and V (vanadium) are also important elements in the present invention. By containing one or two types of these elements, the precipitation of carbo-nitrides of Nb or V is promoted. In the case where both of Nb and V are contained, the precipitation of Cr(Nb, V)N is also promoted. Therefore, both nitrides of Cr(Nb, V)N and $Cr_2N$, in which one or more elements of Nb and V is partly dissolved, can be precipitated in the granular portion, and the solubility in the granular portion of C and Cr is decreased, whereby the sensitization can be restrained.

However, if these elements are contained excessively, specifically, if more than 0.30% of Nb or more than 0.40% of V is contained, in either of the cases, not only the precipitation of Cr nitrides from the grain boundary is promoted and therefore the intergranular corrosion resistance may be deteriorated, but also the crack sensitivity in the weld heat-affected zone may be increased remarkably. Therefore, for the contents of Nb and V, the Nb content is 0.30% or less and the V content is 0.40% or less. More preferably, the upper limits of Nb content and V content are 0.26% and 0.35%, respectively.

The above-described Nb and V may be contained singly or compositely. In the case where each of these elements is contained singly to achieve the effect of reducing the Cr concentration in the granular portion brought about by the precipitation of Cr nitrides, each of the lower limits of Nb content and V content is preferably set to 0.01%.

In the case where Nb and V are contained compositely, if the total content exceeds 0.6%, the precipitation of Cr nitrides from the grain boundary is promoted, and the intergranular corrosion resistance is sometimes deteriorated. Therefore, the upper limit of total content is preferably 0.6%.

Also, in the case where Nb and V are contained compositely, the lower limit of the total content of Nb and V is preferably 0.01%.

2. Chemical Composition of Welding Material

The welding material of the present invention that is used when the base metal is welded has a chemical composition consisting, by mass percent, of C: 0.02% or less, Si: 2% or less, Mn: 2% or less, Cr: 26 to 50%, N: 0.15% or less, P: 0.02% or less, S: 0.002% or less, and Ni: a content satisfying Formula (I), and the balance of Fe and impurities:

$$5 \leq Ni \leq Cr-14 \quad (I)$$

where each symbol of element in Formula (I) represents the content (mass %) of each element contained in the welding material.

C: 0.02% or less

From the viewpoint of corrosion resistance, the content of C should be as low as possible to prevent the precipitation of carbides. Further, since C is an austenite stabilizing element, the C content in the welding material should be as low as possible. Therefore, the C content in the welding material is 0.02% or less. The C content is preferably 0.015% or less.

Si: 2% or less

Si is used for deoxidation at the time of welding. Further, Si is an element effective in improving the stability of ferrite. However, if Si is contained excessively, the solidification crack sensitivity of weld metal is increased. Therefore, the Si content is 2% or less. The Si content is preferably 1.5% or less. For the purpose of deoxidation at the time of welding, the Si content is preferably 0.15% or more.

Mn: 2% or less

Mn is contained for the purpose of deoxidation and high strength. However, if the Mn content is excessively high, austenite is stabilized, and the crystallization of ferrite is restrained. Therefore, an upper limit is imposed, and the Mn content is 2% or less. The Mn content is preferably 1% or less. For the purpose of deoxidation and high strength, the Mn content is preferably 0.2% or more.

Cr: 26 to 50%

Cr is an element indispensable to maintain the corrosion resistance. The welding material of the present invention has a feature such that the Cr content thereof is equal to or higher than that of the base metal. In addition, Cr is a ferrite stabilizing element, and the higher content of Cr is effective in preventing weld cracks. From these facts, it is necessary to contain 26% or more of Cr. On the other hand, if the content increases and especially exceeds 50%, the wire drawing workability of welding material decreases. Therefore, the Cr content is 26 to 50%. The Cr content is preferably 27% or more and 40% or less.

N: 0.15% or less

N is an element effective in improving the strength and corrosion resistance. However, since N is an austenite stabilizing element, if N is contained excessively, the weld crack sensitivity increases. Therefore, the N content is 0.15% or less. The N content is preferably 0.1% or less, more preferably 0.08% or less. In order to stably improve the strength and corrosion resistance, the N content is preferably 0.03% or more.

P: 0.02% or less

P is an impurity element, and also is an element that increases the weld crack sensitivity. For this reason, it is desirable to decrease the P content as far as possible; however, an extreme decrease in the P content leads to an increase in cost. Therefore, the P content is 0.02% or less. Preferably, the P content is 0.015% or less.

S; 0.002% or less

Like P, S is an impurity element, and is also an element that increases the weld crack sensitivity. For this reason, it is desirable to decrease the S content as far as possible; however, an extreme decrease in the S content leads to an increase in cost. Therefore, the S content is 0.002% or less. Preferably, the S content is 0.001% or less.

Ni; 5% or more and (Cr-14) % or less

Ni is an element that improves the structural stability and corrosion resistance. On the other hand, Ni is a powerful austenite stabilizing element, and increases the weld crack sensitivity. However, if an upper limit is imposed on the Ni content, and the Ni content satisfies Formula (I) indicated above in relationship with the Cr content, weld cracks can be suppressed. An excessive decrease in the Ni content brings about the deterioration in sensitization resistance caused by the decrease in stacking fault energy, and leads to a decrease in structural stability and strength. Therefore, the lower limit of the Ni content is preferably 5%.

One of the welding materials of the present invention is a welding material containing elements of the above-described C through Ni, the balance being Fe and impurities.

The impurities as referred to herein mean the substances that contaminate metal materials during the industrial manufacturing process, derived from the raw materials such as ores and scrap, and various other factors.

Another of the welding materials of the present invention is a welding material containing, in lieu of part of Fe, one or more elements selected from Mo, Nb, V, and REM having the contents described below.

Mo: 1% or less

Mo may be contained as necessary because of having an action for restraining sensitization. However, if the Mo content increases and exceeds 1%, the precipitation of sigma phase is induced at high temperature. Therefore, the content of Mo, if contained, is 1% or less. The preferable upper limit of Mo content is 0.5%. In the case where it is desired to stably achieve the effect brought about by Mo, 0.10% or more of Mo is preferably contained, and 0.15% or more of Mo is more preferably contained.

Nb: 0.5% or less and V: 1% or less

Since Nb and V have an action for restraining sensitization produced by the formation of Cr nitrides, either one or both of Nb and V may be contained as necessary. However, if the Nb content and the V content exceeds 0.5% and 1%, respectively, and a large amount of Cr nitrides are precipitated, the matrix strengthening is promoted, and the reheat crack sensitivity in the weld metal is increased remarkably. Also, in the case where both of Nb and V are contained, if the value calculated by (2×Nb+V) exceeds 1%, a remarkable increase in the reheat crack sensitivity in the weld metal occurs. Therefore, in the case where both of Nb and V are contained, Formula (II) needs to be satisfied. The preferable upper limit of the left-hand side of Formula (II) is 0.7%. In the case where it is desired to stably achieve the above-described effect brought about by Nb and/or V, the lower limit value of the left-hand side of Formula (II) is preferably 0.1%, and is more preferably 0.15%:

$$2 \times Nb + V \leq 1 \quad (II)$$

where each symbol of element in Formula (II) represents the content (mass %) of each element contained in the welding material.

REM: 0.05% or less

REM (rare earth metal) has an action for immobilizing an element that increases the reheat crack sensitivity, such as S or P, in the granular portion. Therefore, in order to achieve the effect of suppressing reheat cracking in the weld metal, REM may be contained as necessary. However, if the REM content becomes excessive and especially exceeds 0.05%, the solidification crack sensitivity in the weld metal is increased. Therefore, the content of REM, if contained, is 0.05% or less. The preferable upper limit of REM content is 0.03%. In the case where it is desired to stably achieve the effect brought about by REM, 0.01% or more of REM is preferably contained, and 0.015% or more of REM is more preferably contained.

REM is the general term of a total of 17 elements consisting of Sc, Y and lanthanoids. The REM content means the total content of the above-described elements.

The shape of the welding material used in the present invention is not subject to any special restriction, and a solid wire, a flux-cored wire, an insert ring, and the like used for the ordinary GTAW, GMAW, and the like can be used.

3. Chemical Composition of Weld Metal

The chemical composition of a weld metal formed by using the base metal having the chemical composition described in the item 1 and the welding material having the chemical composition described in the item 2 is determined by the inflow ratio of the base metal and the welding material. Therefore, in the welding joint of the present invention, the root pass portion of weld metal has a chemical composition consisting, by mass percent, of C: 0.02% or less, Si: 0.06 to 1.6%, Mn: 0.08 to 2%, Cr: 24.5 to 45%, Ni: 12 to 25%, Mo: 0.1 to 0.9%, N: 0.035 to 0.15%, P: 0.02% or less, and S: 0.002% or less, and one or two elements of Nb: 0.005 to 0.3% and V: 0.005 to 0.3%, and the balance of Fe and impurities.

Among the above-described elements, in particular, the C content is preferably 0.015% or less. Also, the Si content is preferably 0.15% or more and 1.3% or less. The Mn content is preferably 0.3% or more and 1% or less. The Cr content is preferably 25% or more and 35% or less. The Ni content is preferably 22% or less. The Mo content is preferably 0.12% or more and 0.5% or less. The N content is preferably 0.045% or more and 0.11% or less. The Nb content is preferably 0.01% or more, and the V content is preferably 0.01% or more.

In the following, the present invention is explained more specifically with reference to examples. The present invention is not limited to these examples.

EXAMPLE 1

Two types of austenitic stainless steels each having the chemical compositions shown in Table 1 were melted, hot-forged, hot-rolled, and subjected to solid solution heat treatment at 1060° C. Thereafter, test pieces for restraint weld cracking test having a thickness of 12 mm, a width of 50 mm, and a length of 100 mm, in which a U-type groove having a root radius r of 1.5 mm, a root face b of 1.5 mm, and a groove angle θ of 40° in No. 14349 of JIS Z3001-1 (2008) and a V-type groove having a root face b of 1 mm and a groove angle θ of 60° in No. 14343, were prepared. By using the test pieces for restraint weld cracking test obtained as described above, the periphery thereof was subjected to restraint welding onto a commercially available steel plate of SM400C specified in JIS G3106 (2008) having a thickness of 25 mm, a width of 200 mm, and a length of 200 mm by using a covered electrode of ENi6182 specified in JIS Z3224 (2010).

TABLE 1

| Base metal | Chemical composition (in mass %, balance: Fe and impurities) | | | | | | | | | | |
|---|---|---|---|---|---|---|---|---|---|---|---|
| | C | Si | Mn | P | S | Cr | Ni | Nb | V | Mo | N |
| I | 0.009 | 0.21 | 0.49 | 0.009 | 0.001 | 24.60 | 19.20 | 0.05 | 0.10 | 0.30 | 0.10 |
| II | 0.007 | 0.21 | 0.49 | 0.011 | 0.001 | 24.30 | 19.70 | 0.09 | — | 0.33 | 0.08 |

Thereafter, root pass TIG welding was performed in the grooves by using four types of 1.2 mm-diameter spool welding materials given in Table 2. The heat input was set to 7.2 to 10.8 kJ/cm, and the feed rate of welding material was changed in the range of 316 to 700 mm/min. Subsequently, about a half length of root pass weld zone was left, and the remaining portion was subjected to multi-pass welding under the condition of heat input of 7.2 kJ/cm. At this time, the pass-to-pass temperature was controlled so as to be 150° C. or lower.

After the above-described welding, from each of the test pieces, three test specimens for observing the cross-sectional micro-structure of the joint were sampled from a portion in which the root pass welding had been performed, and three test specimens therefor were sampled from a portion in which multi-pass welding had been performed. The cross section was mirror polished and thereafter was subjected to chromic acid electrolytic etching. Then, the presence of cracks was observed under an optical microscope having a magnification of ×500. A crack found in the portion in which only the root pass welding had been performed is thought to be solidification cracking, and a crack found in the portion in which multi-pass welding had been performed is thought to be reheat cracking. Also, the central portion of weld metal sampled from the portion in which only the root pass welding had been performed was subjected to EPMA analysis and quantified, whereby the composition of the weld metal was measured. These results are shown in Tables 3 and 4.

TABLE 2

| Welding material | Chemical composition (in mass %, balance: Fe and impurities) | | | | | | | | | | | |
|---|---|---|---|---|---|---|---|---|---|---|---|---|
| | C | Si | Mn | P | S | Cr | Ni | Nb | V | Mo | N | REM† |
| A | 0.009 | 0.20 | 0.48 | 0.008 | 0.001 | 32.20 | 11.25 | — | — | — | 0.08 | — |
| B | 0.008 | 0.22 | 0.49 | 0.008 | 0.001 | 32.10 | 10.46 | 0.05 | 0.10 | 0.31 | 0.08 | — |
| C | 0.008 | 0.20 | 0.51 | 0.006 | 0.001 | 31.50 | 10.82 | — | — | — | 0.08 | 0.013 |
| D | 0.011 | 0.23 | 0.50 | 0.026* | 0.001 | 27.25 | 17.23* | — | — | — | 0.10 | — |

*indicates that chemical composition does not satisfy the range defined by the present invention.

†REM corresponds to La + Ce.

TABLE 3

| Base metal | Welding material | Weld metal No. | Groove shape | Heat input | Feed rate | Solidification cracking | Reheat cracking | |
|---|---|---|---|---|---|---|---|---|
| I | A | A1 | U-type | 7.2 kJ | 316 mm/min | 0/3 | 0/3 | Inventive |
| | | A2 | U-type | 7.2 kJ | 490 mm/min | 0/3 | 0/3 | Examples |
| | | A3 | U-type | 7.2 kJ | 700 mm/min | 0/3 | 0/3 | |
| | | A4 | V-type | 10.8 kJ | 490 mm/min | 0/3 | 0/3 | |
| | B | B1 | V-type | 10.8 kJ | 490 mm/min | 0/3 | 0/3 | |
| | C | C1 | V-type | 10.8 kJ | 490 mm/min | 0/3 | 0/3 | |
| | D* | D1 | U-type | 7.2 kJ | 316 mm/min | 1/3 | 2/3 | Comparative |
| | | D2 | U-type | 7.2 kJ | 490 mm/min | 1/3 | 2/3 | Examples |
| | | D3 | U-type | 7.2 kJ | 700 mm/min | 0/3 | 1/3 | |
| | | D4 | V-type | 10.8 kJ | 490 mm/min | 0/3 | 1/3 | |
| II | A | A5 | V-type | 10.8 kJ | 490 mm/min | 0/3 | 0/3 | Inventive |
| | B | B2 | V-type | 10.8 kJ | 490 mm/min | 0/3 | 0/3 | Examples |
| | D* | D5 | U-type | 7.2 kJ | 490 mm/min | 0/3 | 2/3 | Comp. Ex. |

*indicates that chemical composition does not satisfy the range defined by the present invention.

TABLE 4

| Base | Welding | Weld metal | Chemical composition (in mass % balance: Fe and impurities) | | | | | | | | | | | |
|---|---|---|---|---|---|---|---|---|---|---|---|---|---|---|
| metal | material | No. | C | Si | Mn | P | S | Cr | Ni | Nb | V | Mo | N | REM† |
| I | A | A1 | 0.009 | 0.21 | 0.49 | 0.008 | 0.001 | 26.54 | 17.17 | 0.04 | 0.07 | 0.22 | 0.09 | — |
| | | A2 | 0.009 | 0.21 | 0.49 | 0.008 | 0.001 | 27.00 | 16.69 | 0.03 | 0.07 | 0.21 | 0.09 | — |
| | | A3 | 0.009 | 0.21 | 0.49 | 0.007 | 0.001 | 28.08 | 15.56 | 0.03 | 0.05 | 0.16 | 0.09 | — |
| | | A4 | 0.009 | 0.20 | 0.48 | 0.006 | 0.001 | 30.03 | 13.52 | 0.01 | 0.03 | 0.09 | 0.09 | — |
| | B | B1 | 0.008 | 0.22 | 0.49 | 0.008 | 0.001 | 29.93 | 12.99 | 0.05 | 0.1 | 0.31 | 0.09 | — |
| | C | C1 | 0.008 | 0.20 | 0.50 | 0.007 | 0.001 | 29.43 | 13.33 | 0.02 | 0.03 | 0.09 | 0.09 | 0.010 |
| | D* | D1 | 0.009 | 0.21 | 0.49 | 0.012 | 0.001 | 25.03 | 18.88 | 0.04 | 0.08 | 0.25 | 0.10 | — |
| | | D2 | 0.009 | 0.21 | 0.49 | 0.013 | 0.001 | 25.21 | 18.75 | 0.04 | 0.08 | 0.23 | 0.10 | — |
| | | D3 | 0.010 | 0.22 | 0.49 | 0.014 | 0.001 | 25.45 | 18.57 | 0.03 | 0.07 | 0.20 | 0.10 | — |
| | | D4 | 0.011 | 0.23 | 0.50 | 0.023 | 0.001 | 25.71 | 18.23 | 0.01 | 0.02 | 0.06 | 0.10 | — |
| II | A | A5 | 0.008 | 0.20 | 0.48 | 0.009 | 0.001 | 29.91 | 13.70 | 0.03 | — | 0.10 | 0.08 | — |
| | B | B2 | 0.008 | 0.22 | 0.49 | 0.009 | 0.001 | 29.84 | 13.14 | 0.06 | 0.07 | 0.32 | 0.08 | — |
| | D* | D5 | 0.010 | 0.22 | 0.50 | 0.022 | 0.001 | 26.39 | 17.95 | 0.03 | — | 0.10 | 0.09 | — |

*indicates that chemical composition does not satisfy the range defined by the present invention.

†REM corresponds to La + Ce.

The numerical value in the columns of solidification cracking and reheat cracking in Table 3 represents the number of test specimens in which the occurrence of cracks was found/the number of test specimens whose cross sections were microscopically observed. Concerning the evaluation of the crack tests conducted in this observation, the weld metal in which the occurrence of at least one crack was found was made unacceptable, and the weld metal in which the occurrence of no crack was found was made acceptable.

When welding materials A to C in which the chemical composition satisfied the definition of the present invention were used, in any test piece, neither solidification cracking nor reheat cracking occurred in the weld metal regardless of welding conditions, whereas when welding material D in which the chemical composition deviated from the definition of the present invention was used, in all test pieces, a weld crack was found in the weld metal.

As is apparent from the above, by using a welding material having a proper chemical composition, a welding joint having excellent solidification crack resistance and reheat crack resistance can be obtained.

INDUSTRIAL APPLICABILITY

Because having excellent intergranular corrosion resistance and weld crack resistance, the welding joint using the welding material for an austenitic stainless steel of the present invention is suitable for a welded structural material that is used as a PLR pipe or a core material such as a shroud, which have risks of corrosion damage at grain boundaries in a nuclear power plant.

What is claimed is:

1. A welding joint of an austenitic stainless steel, consisting of:

a base metal of an austenitic stainless steel consisting, by mass percent, of C: 0.02% or less, Si: 0.01 to 0.5%, Mn: 0.01 to 2%, Cr: 24 to 26%, Ni: 18 to 22%, Mo: more than 0.10% and less than 0.50%, N: more than 0.04% and 0.15% or less, P: 0.02% or less, and S: 0.002% or less, and one or two elements of Nb: 0.30% or less and V: 0.40% or less, and the balance of Fe and impurities, and a weld metal formed by using a welding material consisting, by mass percent, of C: 0.02% or less, Si: 2% or less, Mn: 0.51% or less, Cr: 32.10 to 50%, N: 0.15% or less, P: 0.02% or less, 5: 0.002% or less, and Ni: a content satisfying Formula (I), one or more elements selected from Mo: 1% or less, Nb: 0.5% or less, V: 1% or less, and REM: 0.05% or less, and the balance of Fe and impurities:

$$5 \leq Ni \leq Cr - 21.64 \quad (I)$$

$$0.1 \leq Nb + V \leq 1 \quad (II)$$

where each symbol of element in Formulas (I) and (II) represents the content (mass %) of each element contained in the welding material.

2. The welding joint of an austenitic stainless steel according to claim 1, wherein the welding joint is used for PLR pipe or a core material of a boiling water type nuclear power plant.

3. The welding joint of an austenitic stainless steel according to claim 2, wherein the core material is a shroud.

* * * * *